United States Patent [19]
Mochizuki

[11] Patent Number: 5,844,876
[45] Date of Patent: *Dec. 1, 1998

[54] DOUBLE-LAYER OPTICAL DISK, RECORDING METHOD AND MANUFACTURING METHOD OF THIS OPTICAL DISK

[75] Inventor: Masaki Mochizuki, Yokohama, Japan

[73] Assignee: Victor Company of Japan, Ltd., Yokohama, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 721,041

[22] Filed: Sep. 26, 1996

[51] Int. Cl.$^6$ ............................................. G11B 7/00
[52] U.S. Cl. ................................. 369/94; 369/275.3
[58] Field of Search ...................... 369/275.1, 275.2, 369/275.3, 275.4, 13, 94, 286

[56] References Cited

U.S. PATENT DOCUMENTS

| | | | |
|---|---|---|---|
| 4,450,553 | 5/1984 | Holster et al. | 369/94 |
| 5,077,120 | 12/1991 | Kato et al. | 369/286 |
| 5,251,198 | 10/1993 | Strickler | 369/94 |
| 5,398,232 | 3/1995 | Omata | 369/275.4 |
| 5,485,452 | 1/1996 | Maeda | 369/275.1 |
| 5,517,486 | 5/1996 | Haneda | 369/275.4 |
| 5,602,825 | 2/1997 | Sugaya et al. | 369/275.4 |
| 5,608,715 | 3/1997 | Yokogawa et al. | 369/94 |
| 5,636,190 | 6/1997 | Choi | 369/44.23 |
| 5,669,995 | 9/1997 | Hong | 369/286 |
| 5,673,251 | 9/1997 | Suzuki et al. | 369/275.4 |
| 5,679,429 | 10/1997 | Hintz | 369/275.3 |
| 5,703,868 | 12/1997 | Kobayashi et al. | 369/286 |
| 5,706,269 | 1/1998 | Ogura et al. | 369/275.3 |
| 5,708,653 | 1/1998 | Okada et al. | 369/94 |

FOREIGN PATENT DOCUMENTS

| | | |
|---|---|---|
| 0368442 | 5/1990 | European Pat. Off. |
| 0720159 | 7/1996 | European Pat. Off. |
| 0729142 | 8/1996 | European Pat. Off. |
| 0745985 | 12/1996 | European Pat. Off. |
| 9631875 | 10/1996 | WIPO |

*Primary Examiner*—Nabil Hindi
*Attorney, Agent, or Firm*—Pollock, Vande Sande & Priddy

[57] ABSTRACT

A double-layer optical disk comprises first and second substrates which include information pits and are bonded at their confronting faces. Each substrate has at least one information pit formed on a surface thereof for recording the information, and receives reproduction light irradiated from a predetermined reading direction. And, the information pit formed on the first substrate is different in size from the information pit formed on the second substrate.

15 Claims, 3 Drawing Sheets

DOUBLE-LAYER OPTICAL DISK, RECORDING METHOD AND MANUFACTURING METHOD OF THIS OPTICAL DISK

BACKGROUND OF THE INVENTION

1. Field of the Invention

This invention relates to a double-layer optical disk having two recording layers bonded to each other to form a double-layer configuration each including information pits formed on the surface thereof for recording the information, and also relates to a recording method and a manufacturing method of the same.

2. Related Art

According to a conventional optical disk, the information track of a circling or convolutional pattern is formed on the surface of the optical disk. Each information pit, which is a recess-like (or protrusion-like) undulation of the disk surface, is formed along the information track to record the information. An optical head is used to optically reproduce the information recorded in this information pit. To increase the information storing capacity of this kind of optical disk, a double-layer optical disk has been recently proposed.

The double-layer optical disk comprises two parallel optical disks bonded at their faces to provide a two-story recording layer configuration. To improve the operability, laser beam is applied from only one direction to this double-layer optical disk to read out information recorded therein.

FIG. 5 is a cross-sectional view showing the arrangement of a conventional double-layer optical disk.

In FIG. 5, a double-layer optical disk 20 comprises a first optical disk OD1 and a second optical disk OD2 which are substantially parallel to each other and bonded by an adhesive layer 3 interposed therebetween. Adhesive layer 3 acts as a protection layer as well as a bonding layer. Thus, double-layer optical disk 20 has two recording layers. A concentric or spiral information track is formed on each recording layer. An information pit of convex-or-concave configuration is formed along the information track to record the information.

FIG. 5 shows a cross section taken along a radial direction of the double-layer optical disk 20. First optical disk OD1, disposed at a reproduction light source side (i.e. disposed closely to the reproduction optical head), comprises a first substrate 1 and a first reflection film 2. Second optical disk OD2, disposed at the opposite side, comprises a second substrate 5 and a second reflection layer 4. In other words, first substrate 1, first reflection layer 2, adhesive layer 3, second reflection layer 4 and second substrate 5 are accumulated in this order from the bottom to the top of the double-layer optical disk 20.

First substrate 1 has a circling or convolutional information track along which a plurality of information pits p1 are formed to record the information. Second substrate 5 has a similar circling or convolutional information track along which a plurality of information pits p2 are formed to record the information. First and second substrates 1 and 5 are bonded by adhesive like photopolymer resin or the like. First reflection layer 2 has a reflection ratio of 30 to 50%, while second reflection layer 4 has a reflection ratio of 70 to 100%.

To read out the information from double-layer optical disk 20, the laser beam emitted from the reproduction optical head (not shown) is irradiated to the bottom of double-layer optical disk 20 and converged to respective information pits of optical disks OD1 and OD2. Laser beam is then reflected from double-layer optical disk 20 and is received by a photodiode (not shown) to detect the readout information. In this case, the laser beam is irradiated to the same side (i.e. the bottom side in FIG. 5) of the optical disks OD1 and OD2.

According to the double-layer optical disk shown in FIG. 5, the formation of the information pits is fundamentally identical in each of first substrate 1 and second substrate 5. In other words, the width q1 of information pit p1 on the first substrate 1 is equal to the width q2 of information pit p2 on the second substrate 5.

When the reproduction of double-layer optical disk 20 is performed by irradiating the laser beam from the bottom of this disk 20 as shown in FIG. 5, the effective width of information pit p2 is practically influenced by the second reflection layer 4. More specifically, it is supposed that t1 represents the film thickness of first reflection layer 2, while t2 represents the film thickness of second reflection layer 4. In this case, the effective width of information pit p1 of first optical disk OD1 is substantially equal to q1 as expected. On the other hand, the effective width of information pit p2 of second optical disk OD2 is smaller than q2 and substantially equal to $q2-2 \cdot t2$, i.e. $q4=q2-2 \cdot t2$.

In short, according to the conventional double-layer optical disk 20, the effective width of each information pit is substantially different between both substrates.

More specifically, in the reproduction of information pit p1 on the reading side substrate (first substrate 1), the reproduction light entered from first substrate 1 is converged to information pit p1 in the same manner as in the single-layer reading optical system. The reproduction light is then reflected by the boundary between the information pit p1 and first reflection layer 2 and received by the photodiode (not shown) equipped in the reading optical head (not shown), thus reading out the information from first optical disk OD1.

On the other hand, in the reproduction of information pit p2 on the opposite side substrate (second substrate 2), the reproduction light entered from first substrate 1 is first subjected to first reflection layer 2 and partly reflected by the boundary between information pit p1 and first reflection layer 2. The remainder of the reproduction light is then converged to the surface of second reflection layer 4 formed along information pit q2 on second substrate 5, and is thereafter reflected by the surface of second reflection layer 4 and received by the photodiode (not shown) equipped in the reading optical head (not shown), thus reading out the information from the second optical disk OD2.

As apparent from the foregoing description, the substantial reflection surface of information pit p1 on first substrate 1 is the boundary surface between information pit p1 and first reflection layer 2. On the other hand, the substantial reflection surface of information pit p2 on second substrate 5 is the surface of second reflection layer 4 formed on second substrate 5.

Thus, the effective size of the information pit in the reproduction is defined by the reflection surface of reflection layer 4 not by the information pit p2 itself (convex or concave undulation of the surface). Hence, when the size of the information pit is determined to be identical in each of two optical disks OD1 and OD2, there is the problem that the effective width of the information pit is differentiated between these two optical disks OD1 and OD2. Accordingly, the asymmetry characteristics of the reproduction signals read out by the optical head or the characteristics of servo signals (focus error signals etc.) produced from the reproduction signals will be differentiated between two optical layers of the double-layer optical disk. Thus, controlling the reproduction system will become difficult.

SUMMARY OF THE INVENTION

Accordingly, in view of above-described problems encountered in the related art, a principal object of the present invention is to eliminate the dispersion between two optical recording layers of a double-layer optical disk in various characteristics, such as asymmetry characteristics of reproduction signals or servo signal characteristics producible from the reproduction signals.

In order to accomplish this and other related objects, the present invention provides a double-layer optical disk comprising first and second substrates which include information pits and are bonded at their confronting faces. Each substrate has at least one information pit formed on a surface thereof for recording the information, and receives reproduction light irradiated from a predetermined reading direction (only one direction). And, the information pit formed on the first substrate is different in size from the information pit formed on the second substrate.

Preferably, in the double-layer optical disk of the present invention, the size of the information pit formed on the second substrate is determined by the following equation.

$$W2 = W1 + \beta \cdot 2t \cdot \tan(\theta/2) \cdot (\cos\theta + \alpha)/(1+\alpha)$$

where W1 represents the width or length of the information pit of the first substrate disposed at the reading side, W2 represents the width or length of the information pit of the second substrate disposed at the opposite side before any reflection layer is formed on this second substrate, $\theta$ represents the wall angle of the information pit formed on the second substrate, t represents the film thickness of the second reflection layer formed on the second substrate, $\alpha$ represents a correction factor relating to the reflection layer forming apparatus and the reflection layer forming conditions, and $\beta$ represents another correction factor in the range of 0.5 to 2.0.

Furthermore, the present invention provides the following simplified equation for obtaining the size of the information pit formed on the second substrate, considering the representative value of the wall angle of the information pit, and the practical value of the correction factor a relating to the flowing of the reflection layer to the information pit wall surface during the film forming process.

$$W2 = W1 + 0.75 \cdot \beta t$$

Thus, it becomes possible to simply correct the size of the information pit of the second substrate using the size of the information pit of the first substrate.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENT

Figure 1:
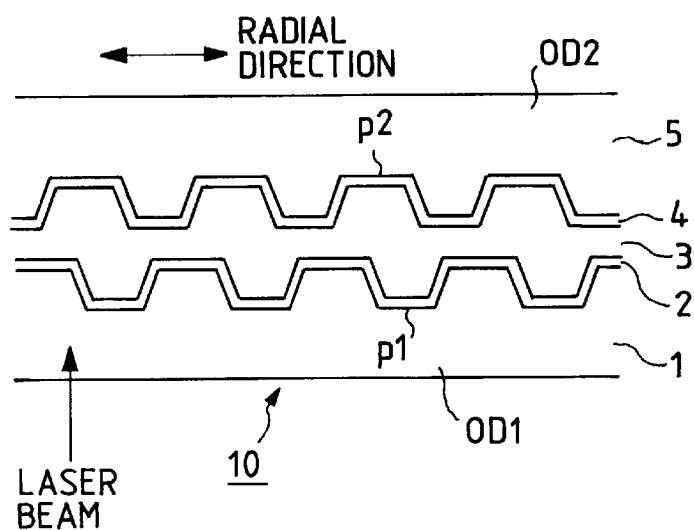
FIG. 1 is a cross-sectional view showing a double-layer optical disk in accordance with a preferred embodiment of the present invention.

A preferred embodiment of the present invention will be explained in greater detail hereinafter with reference to the accompanying drawings. Identical parts are denoted by the same reference numerals throughout the views.

A double-layer optical disk of the present invention comprises first and second optical disks disposed in parallel to each other and bonded at their faces to form a double-layer configuration. The first optical disk comprises a first substrate on the surface of which at least one information pit p1 is formed and a first reflection layer formed along the surface of the first substrate. The second optical disk comprises a second substrate on the surface of which at least one information pit p2 is formed and a second reflection layer formed along the surface of the second substrate. The reproduction light is irradiated from only one direction to read out the information from respective optical disks.

FIG. 1 shows an embodiment of the double-layer optical disk in accordance with the present invention.

In FIG. 1, a double-layer optical disk 10 comprises a first optical disk OD1 and a second optical disk OD2 which are substantially parallel to each other and bonded by an adhesive layer 3 interposed therebetween. Adhesive layer 3 acts as a protection layer as well as a bonding layer. Accordingly, double-layer optical disk 10 has two optical recording layers. A concentric or spiral information track is formed on each recording layer. An information pit of convex-or-concave configuration is formed along the information track to record the information.

More specifically, first optical disk OD1, disposed at a reproduction light source side (i.e. disposed closely to the reproduction optical head), comprises first substrate 1 and first reflection layer 2. Second optical disk OD2, disposed at the opposite side, comprises second substrate 5 and second reflection layer 4. In other words, double-layer optical disk 10 comprises first substrate 1, first reflection layer 2, adhesive layer 3, second reflection layer 4 and second substrate 5 which are accumulated in this order from the bottom to the top of the double-layer optical disk 10.

First substrate 1 has a circling or convolutional information track along which a plurality of information pits p1 are formed to record the information. Second substrate 5 has a similar circling or convolutional information track along which a plurality of information pits p2 are formed to record the information. First and second substrates 1 and 5 are bonded by adhesive like photopolymer resin or the like. First reflection layer 2 has a reflection ratio of 30 to 50%, while second reflection layer 4 has a reflection ratio of 70 to 100%.

To read out the information from double-layer optical disk 10, laser beam emitted from the reproduction optical head (not shown) is irradiated to the bottom of double-layer optical disk 10 in FIG. 1 and converged to respective information pits p1 and p2 of optical disks OD1 and OD2. Laser beam is then reflected from double-layer optical disk 10 and is received by a photodiode (not shown) to detect the information. For each of recording layers (OD1 and OD2), the laser beam is irradiated from the same side (i.e. from the bottom in FIG. 1).

According to the present invention, the formation of the information pit is differentiated in each of optical disks OD1 and OD2, so that the size of information pit p2 formed on optical disk OD2 is larger than the size of information pit p1 formed on optical disk OD1. More specifically, in the condition that reflection layer 4 is not formed, the width W2 of information pit p2 formed on second substrate 5 is larger than the width W1 of information pit p1 formed on first substrate 1. By adjusting the value of W2, the effective width of the information pit p2 on the second substrate 5 can be equalized to W1.

Hereinafter, determination of the size of each information pit of the double-layer optical disk, which is the essential features of the present invention, will be explained with reference to FIGS. 2A and 2B.

Figure 2A:
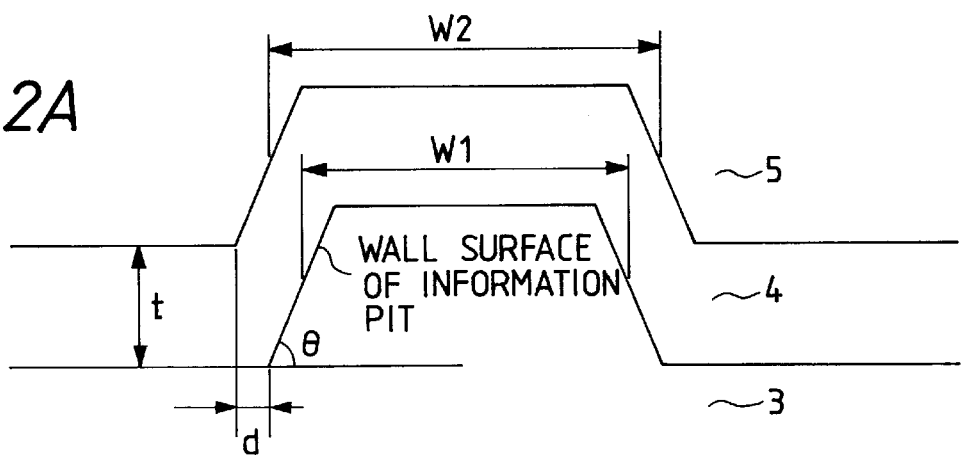
FIGS. 2A and 2B are enlarged views showing the detailed size of an information pit in accordance with the embodiment of the present invention.
Figure 2B:
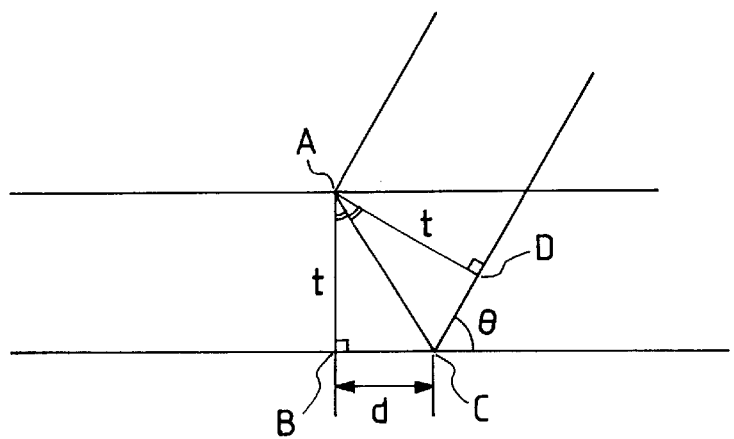

FIGS. 2A and 2B are enlarged views showing the detailed size of the information pit p2 formed on second substrate 5.

In the drawing, W1 represents the width or length of information pit p1 formed on first substrate 1, W2 represents the width or length of information pit p2 formed on second substrate 5, t represents the film thickness of second reflection layer 4, and θ represents the wall angle of information pit p2 formed on second substrate 5.

In this embodiment, the width of each information pit is defined by a value measured at the height corresponding to ½ depth of each information pit.

From the same reason explained in the related art, the second substrate side of the double-layer optical disk 10 is subjected to the change of effective width due to formation of reflection layer 4. In the first substrate side (i.e. the reading side), the width W1 of the information pit p1 is maintained as effective width in the reproduction regardless of the presence of reflection layer 2. On the other hand, in the second substrate side (i.e. the side opposed to the reading side), the effective width W2' of the information pit p2 is reduced from W2 once reflection layer 4 is formed on second substrate 5. In other words, the effective width W2' of information pit p2 is practically influenced by the formation of second reflection layer 4 on second substrate 5. According to the size determination of the present invention, the effective width W2' (<W2) of information pit p2 formed on second substrate 5 is equalized to the effective width W1 of information pit p1 formed on first substrate 1, in the reproduction of the recorded information.

By equalizing the effective width of the information pit in each of first substrate 1 and second substrate 5, it becomes possible to equalize the various characteristics of reproduction signals read out from both of optical recording layers, thus eliminating the dispersion in the asymmetry characteristics of the reproduction signals and the characteristics of the servo signals producible from the reproduction signals.

In FIGS. 2A and 2B, the width W2 of information pit p2 of second substrate 5 is equalized to a value obtainable by correcting the width W1 of information pit p1 in accordance with the film thickness t of second reflection layer 4 and the wall angle θ of information pit p2.

FIG. 2B is an enlarged view showing part of FIG. 2A. In FIG. 2B, angle BAC=angle DAC=θ/2, while d=(W2−W1)/2.

Obtaining the relationship between W2 and W1 in this manner will derive the equation $d=t\cdot\tan(\theta/2)$. Hence, in the reproduction of the recorded information, the effective size of information pit p2 is reduced by an amount of $2t\cdot\tan(\theta/2)$.

However, the amount of reflection layer flowing to the wall surface of the information pit varies depending on the film forming apparatus and the film forming conditions, resulting in the difficulty that the influence given from the reflection layer to the information pit size cannot be expressed by the geometrical equation.

In view of the foregoing, the inventor of the present invention has experimentally obtained a correction factor of $(\cos\theta+\alpha)/(1+\alpha)$. It is found that a satisfactory result can be obtained by multiplying this correcting factor to the above-described geometrical equation. In this correction factor, $\alpha$ represents a value relating to the film forming apparatus or film forming conditions and can be experimentally obtained by considering the optimum correction value obtainable when the wall surface of the information pit is perpendicular to the disk substrate. The practical value of $\alpha$ is approximately 0.2.

Furthermore, considering the dispersion of the pits formed at the inner radius region and the outer radius region of the double-layer optical disk, or dispersion of the film thickness of the reflection layer, an additional correction factor $\beta$ ($0.5 \leq \beta \leq 2$) is multiplied to the above-described correcting equation $2t\cdot\tan(\theta/2)\cdot(\cos\theta+\alpha)/(1+\alpha)$ to obtain an optimum correction amount.

As a result, the following equation is finally obtained.

$$W2 = W1 + \beta \cdot 2t \cdot \tan(\theta/2) \cdot (\cos\theta+\alpha)/(1+\alpha) \qquad (1)$$

Using this equation, it becomes possible to obtain the reproduction signals having the similar characteristics from both of the information pits on the first and second substrates.

Next, a recording method and a recording apparatus of the double-layer optical disk of the present invention will be explained with reference to FIG. 3.

Figure 3:
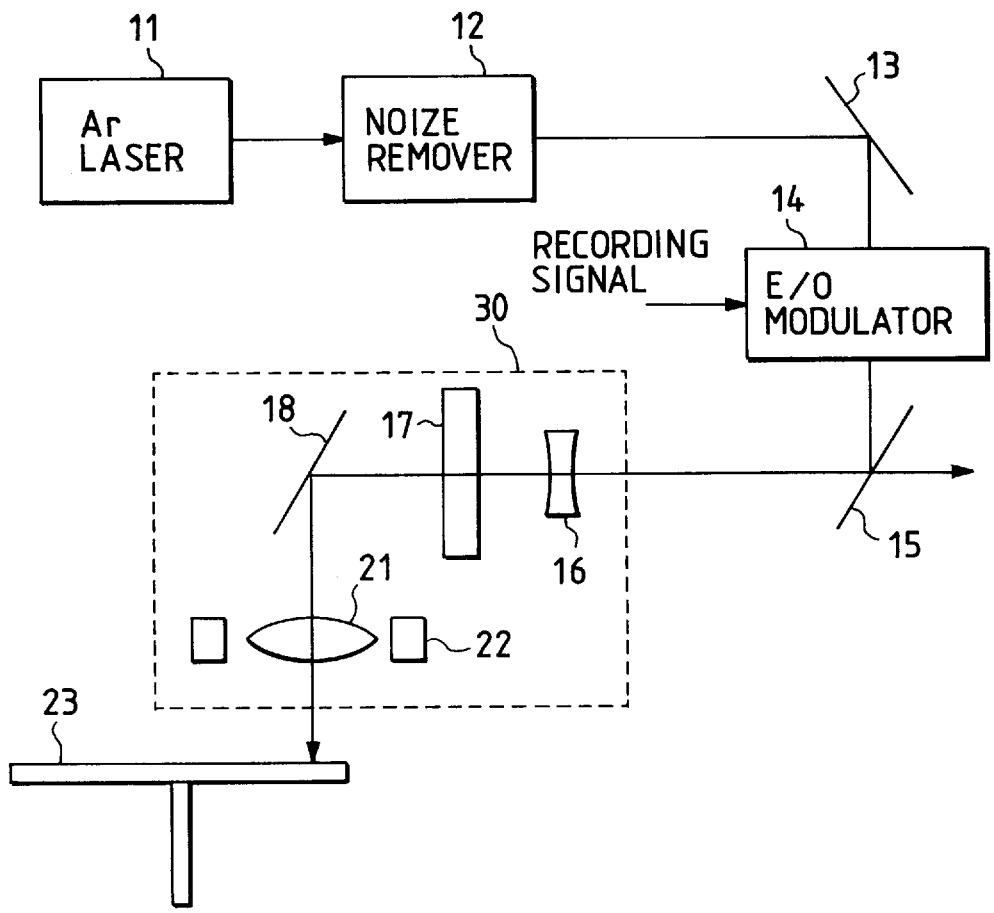
FIG. 3 is a schematic arrangement of a cutting optical system in a recording apparatus of a double-layer optical disk in accordance with the present invention.

In FIG. 3, a cutting beam emitted from a gas (Ar) laser source 11 is entered into a noise remover 12 to produce a noiseless laser beam which is later reflected by a mirror 13. The laser beam reflected by mirror 13 is then entered into an E/O modulator 14 and modulated in accordance with a recording signal. Thereafter, the modulated laser beam is reflected by a beamsplitter 15 and then entered into a recording optical head 30.

Recording optical head 30 comprises a lens 16, a slit 17, a mirror 18, an objective lens 21 and an actuator 22. The modulated laser beam, entered in this recording optical head 30, is adjusted to beam width by slit 17, and then converged on the surface of a glass disk 23 which is coated by photoresist. Actuator 22 performs the focus control of objective lens 21.

The photoresist causes the optical reaction when it receives the converged laser beam (cutting light) and changes its characteristics. After finishing the cutting operation, glass disk 23 is subjected to the developing process through which only the portion exposed to the cutting light is removed off. Thus, the surface of glass disk 23 is undulated in a convex and concave manner; this undulation forms the information pit. Normally, the depth of the resist is equivalent to the depth of the information pit.

In this case, the factors giving any influence to the size of information pit p1 formed on first substrate 1 are various cutting conditions including resist sensitivity, resist thickness, wavelength of the cutting light, cutting power, NA of objective lens 21, slit width, duty correction value of the recording signal, and so on.

On the other hand, in the case of second substrate 5, the effective size of information pit p2 is defined by the substantial surface size of second reflection layer 4 within the region of information pit p2. Hence, the effective size of information pit p2 formed on second substrate 5 is influenced by the film thickness t of reflection layer 4 and the reflection layer forming conditions in addition to the above-described cutting conditions.

Besides the above-described factors, there are other factors determining the effective size of the information pit. Hence, in practice, it is necessary to determine the cutting conditions by taking account of all of these factors. However, to the purpose of simplifying the explanation, the embodiment of the present invention deals with the cutting conditions only.

Hereinafter, a method of adjusting the size of the information pit by varying the slit width will be explained. The slit size serves as a parameter for adjusting the size of the information pit in this embodiment.

Figure 4:
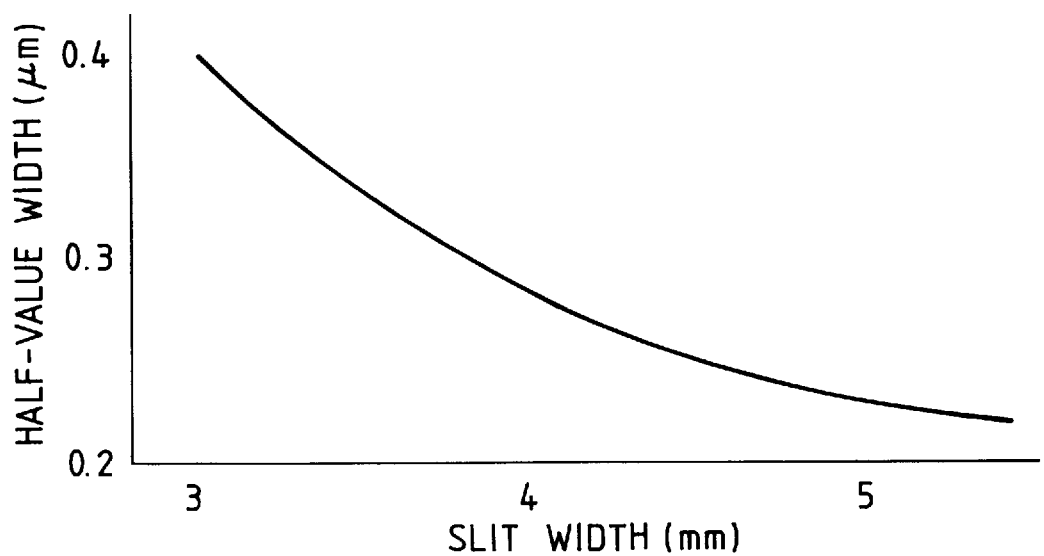
FIG. 4 is a graph showing the relationship between the slit width and the half-value width of laser beam.
Figure 5:
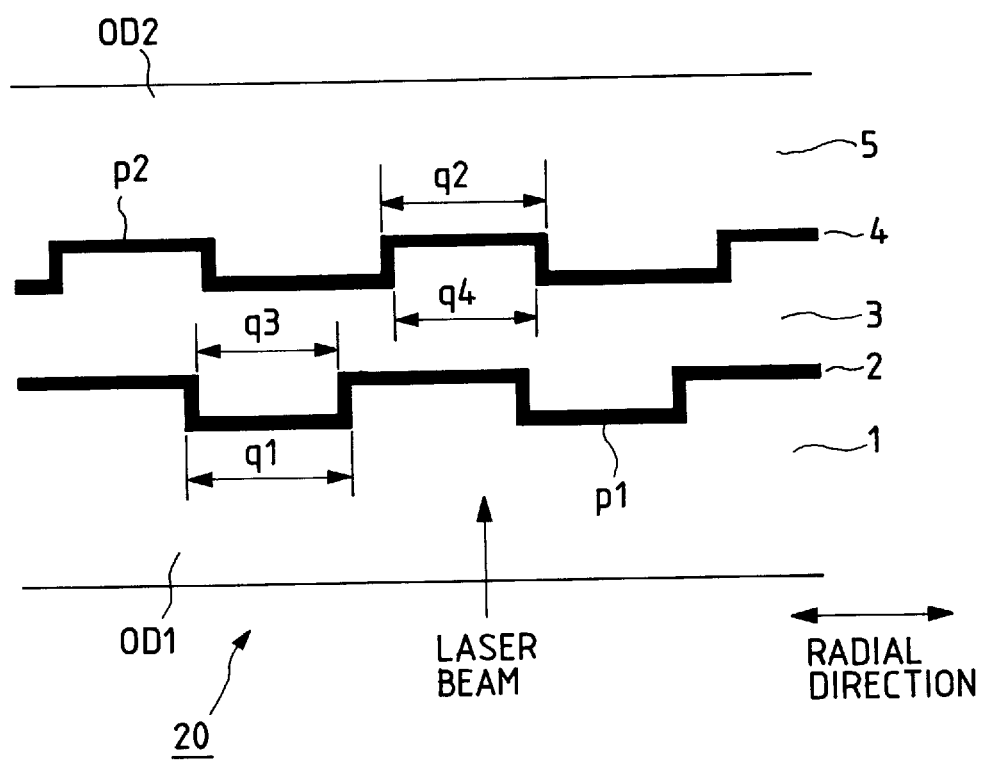
FIG. 5 is a cross-sectional view showing the arrangement of a conventional double-layer optical disk.

FIG. 4 is a graph showing the relationship between the slit width and the half-value width of the laser beam.

As shown in FIG. 4, the half-value width of the laser beam decreases with increasing the slit width of slit 17. Hence, it is possible to control the size of the information pit by varying the slit width of slit 17. In this embodiment, slit 17 is arranged in a manner that changes the width of the information pit.

It is determined, as cutting conditions, that the slit width is set to 4 mm for the cutting of the first substrate 1 and other cutting conditions are fixed or stationary parameters. The film thickness of first reflection layer 2 is fixed to 70 nm.

The correction factor $\alpha$ relating to the reflection layer forming apparatus and the reflection layer forming conditions can be experimentally obtained as shown below.

The correction factor $\alpha$ is obtained in the following manner. First, the cutting power is set to a higher level for the first optical disk OD1 so that the wall surface of the information pit p1 becomes perpendicular to the disk substrate 1. Then, only one frequency is recorded on the first optical disk OD1. Next, for the second optical disk OD2, the cutting power is varied while keeping the perpendicularity of the wall surface of the information pit and the only one frequency is recorded. This operation provides several kinds of bands which are different in the size of information pit. Thereafter, reflection layers 2 and 4 having the film thickness t (70 nm in this embodiment) are formed on first and second substrate 1 and 5, respectively, according to the reflection layer forming apparatus and the reflection layer forming conditions. Then, two optical disks OD1 and OD2 thus finished are set in parallel to each other and bonded by adhesive 3 so as to constitute a double-layer configuration.

In the reproduction of the information recorded, this double-layer optical disk 10 is irradiated by laser beam emitted from the predetermined reading side close to first optical disk OD1 and far from second optical disk OD2. A cutting band capable of obtaining the same reproduction signal as that in the reproduction of the information pit p1 of first optical disk OD1 is selected from second optical disk OD2. In this case, assuming that W1 represents the pit width of first optical disk OD1 and W2 represents the pit width of second optical disk OD2 before reflection layer 4 is formed, and when $\beta=1$, $$W2=W1+2t\cdot tan(\pi/4)\cdot(cos(\pi/2)+\alpha)/(1+\alpha)$$

Accordingly, the following equation is derived.

$$\alpha=(W2-W1)/(2t-(W2-W1)) \quad (2)$$

According to the embodiment of the present invention, $\alpha$ is approximately 0.2.

It is found from the microscopic observation that the information pit on first optical substrate, recorded under the cutting conditions determined in the above-described manner, has the width of 300 nm and the wall angle of approximately 60°.

In this case, $$W2=300+2\times70\times tan(30\ deg)\cdot(cos\ (60\ deg)+0.2)/(1+0.2)=347.2\ nm$$

Hence, in the formation of information pit p2 on second substrate 5, the size of information pit p2, as cutting conditions, is set to be approximately 16% larger than information pit p1 formed on first substrate 1.

Returning to the graph of FIG. 4, when the slit width for cutting first substrate 1 is set to 4 mm, the slit width for cutting second substrate 2 is set to 3.5 mm. With this setting, the half-value width of laser beam is increased approximately 14% which almost satisfies the above-described calculated conditions.

Furthermore, W2 can be obtained using the following simplified equation.

$$W2=W1+0.75\cdot\beta\cdot t \quad (3)$$

When $\beta=1$, $$W2=300+0.75\times70=352.5\ nm$$

Accordingly, satisfactory result can be obtained by setting the slit width in the previously-described manner.

In practice, the cutting conditions should be precisely set by multiplying the correction factor $\beta$ ($0.5\leq\beta\leq2$) relating to the film thickness distribution of the reflection layer, deformation of the information pit during formation thereof, and the difference between the inner radius region and the outer radius region.

The recording optical system disclosed in the above-described embodiment basically controls the slit width of slit 17 to change the width of the information pit. However, to embody the present invention, it will be possible to change the recording power without changing the recording optical system and the recording signal.

Furthermore, the size of the information pit is not limited to the width only; for example, the length of the information pit is also the size to be controlled by the present invention. It is needless to say that the correction of the size can be applied to both the width and the length of the information pit.

Moreover, as a conventional method of changing the pit length in the time-axis direction, there is known a recording signal duty correcting method which changes the pulse width of a recording electric signal. It will be easy to change the pit length in the time-axis direction by using this duty correcting method.

In the above-described explanation, the pit width of each information pit is defined as a value measured at the height corresponding to ½ depth of each information pit. This embodiment adopts such a provisional definition in view of the fact that the relationship between the cutting conditions and the pit width cannot be univocally determined. In the practical setting of the cutting conditions, it is necessary to further consider the relationship between the sensitivity curve of the resist and the intensity curve of the cutting beam, so that the relationship between the cutting condition and the pit width can be defined more simply.

Furthermore, in the explanation of the present invention, the information pit is referred to as a portion where the resist is removed by irradiating the cutting beam in the cutting operation of the ordinary manufacturing process of the optical disk. This relation could be reversed according to the manufacturing process or the reproduction method actually adopted. In such a case, it will be apparent that the size relationship is correspondingly reversed between the information pit on the first substrate and the information pit on the second substrate. Thus, in the above-described correcting equation, W1 and W2 are replaced with each other.

As explained in the foregoing description, according to the optical disk, its recording method, and its manufacturing method, two optical disks are bonded at their faces so as to constitute a double-layer configuration to record the information by the information pit, formed on the surface of each recording layer. In the reproduction of the information from two recording layers of this double-layer optical disk, the reproduction signals read out from both optical disks have substantially identical characteristics. Hence, the asymmetry of the reproduction signals or the servo signals (focus error signal etc.) producible from the reproduction signals become similar between two optical recording layers. As a result, the control of the reproduction apparatus can be simplified.

As this invention may be embodied in several forms without departing from the spirit of essential characteristics thereof, the present embodiment described is therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. A double-layer optical disk comprising:
first and second optical disks disposed in parallel to each other and bonded at their faces to form a double-layer configuration, each optical disk having information pits formed on a surface thereof for recording information and receiving a single reproduction light irradiated from a predetermined reading direction for reading said first and second optical disks and which passes through said first layer when reading information on said second layer, wherein
the information pits formed on said first optical disk are different in a fundamental pit size from the information pits formed on said second optical disk by an amount which corrects for an optical influence of a reflection layer intervening between pit surfaces of said first and second optical disks thereby equalizing an effective pit size of the first optical disk with an effective pit size of the second optical disk when seen from said predetermined reading direction of said reproduction light.

2. The double-layer optical disk in accordance with claim 1, wherein said first optical disk is disposed closely to said reproduction light than said second optical disk, and said information pit formed on said second optical disk is larger in size than the information pit formed on said first optical disk.

3. The double-layer optical disk in accordance with claim 2, wherein said first optical disk comprises a first substrate on the surface of which said information pit is formed and a first reflection layer formed along the surface of said first substrate, while said second optical disk comprises a second substrate on the surface of which said information pit is formed and a second reflection layer formed along the surface of said second substrate, and said first optical disk and said second optical disk are bonded by an adhesive layer so that said first substrate, first reflection layer, adhesive layer, second reflection layer and second substrate are accumulated in this order so as to constitute a double-layer configuration.

4. The double-layer optical disk in accordance with claim 3, wherein the size of said information pit formed on said second substrate is determined by the following equation, $$W2 = W1 + \beta \cdot 2t \cdot \tan(\theta/2) \cdot (\cos\theta + \alpha)/(1+\alpha)$$

where W1 represents the width or length of the information pit formed on said first substrate, W2 represents the width or length of the information pit formed on said second substrate before said second reflection layer is formed on said second substrate, $\theta$ represents the wall angle of the information pit formed on said second substrate, t represents the film thickness of said second reflection layer, $\alpha$ represents a correction factor relating to the formation of said second reflection layer, and $\beta$ represents another correction factor in the range of 0.5 to 2.0.

5. The double-layer optical disk in accordance with claim 3, wherein the size of said information pit formed on said second substrate is determined by the following equation, $$W2 = W1 + 0.75 \cdot \beta \cdot t$$

where W1 represents the width or length of the information pit formed on said first substrate, W2 represents the width or length of the information pit formed on said second substrate before said second reflection layer is formed on said second substrate, t represents the film thickness of said second reflection layer, and $\beta$ represents a correction factor in the range of 0.5 to 2.0.

6. A recording method for a double-layer optical disk which comprises first and second optical disks disposed in parallel to each other and bonded at their faces to form a double-layer configuration, each optical disk having information pits formed on a surface thereof for recording the information and receiving a single reproduction light irradiated from a predetermined reading direction for reading each of said first and second optical disks which passes through said first optical disk when reading said second optical disk, said recording method comprising the step of recording the information on both of said first and second optical disks by differentiating a fundamental pit size of the information pits formed on said first optical disk from a fundamental size of the information pits formed on said second optical disk by an amount for correcting an optical influence of a reflection layer intervening between pit surfaces of said first and second optical disks, thereby equalizing an effective pit size of the first optical disk with an effective pit size of the second optical disk when seen from said predetermined reading direction of said reproduction light.

7. The recording method for the double-layer optical disk in accordance with claim 6, wherein said first optical disk is disposed closely to said reproduction light than said second optical disk, and said recording step is performed so as to satisfy the condition that said information pit formed on said second optical disk is larger in size than the information pit formed on said first optical disk.

8. The recording method for the double-layer optical disk in accordance with claim 7, wherein said first optical disk comprises a first substrate on the surface of which said information pit is formed and a first reflection layer formed along the surface of said first substrate, while said second optical disk comprises a second substrate on the surface of which said information pit is formed and a second reflection layer formed along the surface of said second substrate, and said first optical disk and said second optical disk are bonded by an adhesive layer so that said first substrate, first reflection layer, adhesive layer, second reflection layer and second substrate are accumulated in this order so as to constitute a double-layer configuration.

9. The recording method for the double-layer optical disk in accordance with claim 8, wherein said recording step is performed so as to satisfy the following equation, $$W2 = W1 + \beta 2t \cdot \tan(\theta/2) \cdot (\cos\theta + \alpha)/(1+\alpha)$$

where W1 represents the width or length of the information pit formed on said first substrate, W2 represents the width or length of the information pit formed on said second substrate before said second reflection layer is formed on said second substrate, θ represents the wall angle of the information pit formed on said second substrate, t represents the film thickness of said second reflection layer, α represents a correction factor relating to the formation of said second reflection layer, and β represents another correction factor in the range of 0.5 to 2.0.

10. The recording method for the double-layer optical disk in accordance with claim 8, wherein said recording step is performed so as to satisfy the following equation, $$W2 = W1 + 0.75 \cdot \beta \cdot t$$

where W1 represents the width or length of the information pit formed on said first substrate, W2 represents the width or length of the information pit formed on said second substrate before said second reflection layer is formed on said second substrate, t represents the film thickness of said second reflection layer, and β represents a correction factor in the range of 0.5 to 2.0.

11. A manufacturing method for a double-layer optical disk which comprises first and second optical disks disposed in parallel to each other and bonded at their faces to form a double-layer configuration, each optical disk having information pits formed on a surface thereof for recording the information and receiving a single reproduction light irradiated from a predetermined reading direction for reading said first and second optical disk, which passes through said first optical disk when reading said second optical disk, said manufacturing method comprising the step of forming the information pits on said first optical disk, and forming the information pits on said second optical disk, said first and second optical disks information pits being different in a fundamental pit size by an amount for correcting an optical influence of a reflection layer intervening between pit surfaces of said first and second optical disks, thereby equalizing an effective pit size of the first optical disk with an effective pit size of the second optical disk, when seen from said predetermined reading direction of said reproduction light.

12. The manufacturing method for the double-layer optical disk in accordance with claim 11, wherein said first optical disk is disposed closely to said reproduction light than said second optical disk, and said information pit forming step is performed so as to satisfy the condition that said information pit formed on said second optical disk is larger in size than the information pit formed on said first optical disk.

13. The manufacturing method for the double-layer optical disk in accordance with claim 12, wherein said first optical disk comprises a first substrate on the surface of which said information pit is formed and a first reflection layer formed along the surface of said first substrate, while said second optical disk comprises a second substrate on the surface of which said information pit is formed and a second reflection layer formed along the surface of said second substrate, and said first optical disk and said second optical disk are bonded by an adhesive layer so that said first substrate, first reflection layer, adhesive layer, second reflection layer and second substrate are accumulated in this order so as to constitute a double-layer configuration.

14. The manufacturing method for the double-layer optical disk in accordance with claim 13, wherein said information pit forming step is performed so as to satisfy the following equation, $$W2 = W1 + \beta \cdot 2t \cdot \tan(\theta/2) \cdot (\cos\theta + \alpha)/(1+\alpha)$$

where W1 represents the width or length of the information pit formed on said first substrate, W2 represents the width or length of the information pit formed on said second substrate before said second reflection layer is formed on said second substrate, θ represents the wall angle of the information pit formed on said second substrate, t represents the film thickness of said second reflection layer, α represents a correction factor relating to the formation of said second reflection layer, and β represents another correction factor in the range of 0.5 to 2.0.

15. The manufacturing method for the double-layer optical. disk in accordance with claim 13, wherein said information pit forming step is performed so as to satisfy the following equation, $$W2 = W1 + 0.75 \cdot \beta \cdot t$$

where W1 represents the width or length of the information pit formed on said first substrate, W2 represents the width or length of the information pit formed on said second substrate before said second reflection layer is formed on said second substrate, t represents the film thickness of said second reflection layer, and β represents a correction factor in the range of 0.5 to 2.0.

* * * * *